United States Patent [19]
Plainfield et al.

[11] Patent Number: 5,893,075
[45] Date of Patent: Apr. 6, 1999

[54] INTERACTIVE SYSTEM AND METHOD FOR SURVEYING AND TARGETING CUSTOMERS

[75] Inventors: Richard M. Plainfield; Bhagyarekha J. Plainfield, both of Portland, Oreg.

[73] Assignee: Plainfield Software, Portland, Oreg.

[21] Appl. No.: 549,471

[22] Filed: Oct. 27, 1995

Related U.S. Application Data

[63] Continuation of Ser. No. 221,499, Apr. 1, 1994.

[51] Int. Cl.⁶ .............................. G06F 17/60; G06F 17/40
[52] U.S. Cl. ................................ 705/14; 705/15; 705/16; 705/25; 705/10; 235/376
[58] Field of Search ................................. 705/14, 10, 15, 705/16, 21, 26, 27, 25; 235/383, 385, 375, 376

[56] References Cited

U.S. PATENT DOCUMENTS

| | | | |
|---|---|---|---|
| 4,825,045 | 4/1989 | Humble | 235/383 |
| 4,833,308 | 5/1989 | Humble | 235/383 |
| 4,882,675 | 11/1989 | Nichtberger et al. | 364/401 |
| 4,982,346 | 1/1991 | Girouard et al. | 364/578 |
| 5,099,422 | 3/1992 | Foresman et al. | 705/1 |
| 5,173,851 | 12/1992 | Off et al. | 364/401 |
| 5,237,157 | 8/1993 | Kaplan | 235/375 |
| 5,283,731 | 2/1994 | Lalonde et al. | 705/1 |
| 5,347,632 | 9/1994 | Filepp et al. | 395/200.32 |
| 5,502,636 | 3/1996 | Clarke | 705/10 |
| 5,615,123 | 3/1997 | Davidson et al. | 364/479.03 |
| 5,615,342 | 3/1997 | Johnson | 705/27 |
| 5,644,723 | 7/1997 | Deaton et al. | 705/14 |

*Primary Examiner*—Joseph Thomas
*Attorney, Agent, or Firm*—Klarquist Sparkman Campbell Leigh & Whinston LLP

[57] ABSTRACT

An interactive, customer-accessible data processing system embodied in a programmed personal computer that induces customers of a restaurant, store or other business to enter information about themselves into the system. The information, which may include names, addresses, dates and answers to survey questions, is entered into data fields displayed on a display screen. The system enables a business to generate promotional messages tailored to customers based on the customer-entered information. For example, a business can readily generate birthday offer letters to customers based on their name, address, and birth date simply by selecting an option provided by the system. To induce customers to enter the necessary information, the system flashes an incentive message on the computer display screen. The message may offer to enter a customer into a drawing or other contest in return for the customer entering the necessary information into the system.

20 Claims, 14 Drawing Sheets

FIG. 5

```
           MR/MS    FIRST             LAST              MONTH   DAY         PHONE (   )   -
NAME                                          BIRTHDAY                                MONTH  DAY  YEAR
           MR/MS    FIRST             LAST                            WEDDING ANNIVERSAY
SPOUSE
STREET ADDRESS                                CITY               STATE      ZIP CODE
```
—35

36

WOULD YOU LIKE AN INVITE TO OUR NEXT INDIA ART SALE? (Y/N)
WOULD YOU LIKE AN INVITE TO OUR MOTHERS DAY BRUNCH? (Y/N)
WOULD YOU LIKE TO KNOW WHEN OUR PATIO DINING OPENS? (Y/N)
WHY DID YOU SELECT PLAINFIELDS' MAYUR RESTAURANT THIS EVENING? --

FIG. 4

COMPUTERIZED GUEST BOOK  38

!!! FREE !!!       $$$ WIN $$$             !!! FREE!!!
ENTER YOUR NAME AND ADDRESS FOR A CHANCE TO WIN !!!
**** COMPLIMENTARY DINNER FOR 2   VALUE  $75.00 ****
THE COMPUTER PICKS THE WINNER RANDOMLY

PRESS ANY KEY TO CONTINUE  39

33

32

INTERACTIVE SYSTEM AND METHOD FOR SURVEYING AND TARGETING CUSTOMERS

This application is a continuation, of application Ser. No. 08/221,499, filed on Apr. 1, 1994 abandoned.

BACKGROUND OF THE INVENTION

This invention relates generally to data processing systems for gathering and compiling data for marketing purposes. More particularly, this invention relates to an interactive data processing system that induces customers of a restaurant, store or other business or organization to enter information about themselves and their preferences into the system. The system uses the information to generate promotional messages such as mailings for the business tailored to specific customers.

Mass mailings of promotional offers are a common technique for luring potential customers into a business. From pizza restaurants to dentists, businesses inundate people with "junk" mail in an effort to induce patronage. Because most of these mailings are blind, a positive response rate of as little as 2 to 3% is considered successful. Some businesses such as car repair more effectively target potential repeat customers because they have a list of customers' names, addresses and nature of work performed. But even these businesses have little information about a customer's preferences. And other businesses such as restaurants and retail stores often do not even have a list of their customers' names. For these businesses, mass mailings may rarely justify the cost.

Thus in mail marketing the most important factor is the quality of the business's mail list. Ideally, a mail list should include satisfied customers and information about their likes and dislikes so that promotions can be carefully tailored to the right customers. Such tailoring means fewer mailings and lower cost. The savings can be used for sending first class invitations rather than third class postcards; a personal invitation is more likely to be opened, read and considered positively.

Therefore, an object of this invention is to provide an effective way for businesses to gather and compile information on their customers for tailored promotional mailings. More particularly, an object of this invention is to provide an interactive system that induces customers, while at the business, to enter personal data and to answer survey questions. This information may then be used by the business for tailoring its promotional mailings, such as birthday offers, food specials, etc. New customers to the business are continually added to the mail list by the virtue of their patronage.

SUMMARY OF THE INVENTION

An interactive data processing system in accordance with the invention includes a data entry device such as a personal computer accessible to customers for the customers to enter data about themselves into the system. The system further includes a customer database and means for providing a plurality of customer data fields associated with the customer database. Customers use the data entry device to enter their data into the data fields (which preferably are displayed on the computer display screen) and thereby into the customer database. Means are also included in the system for generating promotional messages such as mailings to customers, based on the data entered by the customer into the customer database. To stimulate customers to enter data, the system may include means for inducing customers to enter data about themselves into a customer database, such as generating a message on the computer display screen offering an incentive to the customer for entering such data.

In the preferred embodiment of the invention, the means for providing a plurality of data fields may be constructed to provide fields for a customer's name, address, important dates and associated questions asking a customer for comments such as opinions or preferences. The means for generating promotional messages may be constructed to generate letters tailored to customers based on their entered data. The bodies of these letters may be stored in a system library and selected as appropriate for the customer, such as birthday greetings, anniversary congratulations, dinner specials, etc.

The invention also includes computerized methods, not limited to the data processing system, for surveying and targeting customers. In a preferred embodiment of the invention, the method may include providing a customer database, a plurality of customer database fields and a data entry device for customer to enter data into the fields and thereby in the customer database. Promotional messages are then generated based on the data entered by the customer. The method may further include inducing customers to enter the data such as by displaying a message on a display screen offering an incentive to a customer for entering such data.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 4 is an initial screen display provided by the data processing system to a customer.

FIG. 5 is a subsequent screen display provided by the data processing system, including data fields for an associated customer database and a list of questions.

DETAILED DESCRIPTION OF A PREFERRED EMBODIMENT

Figure 1:
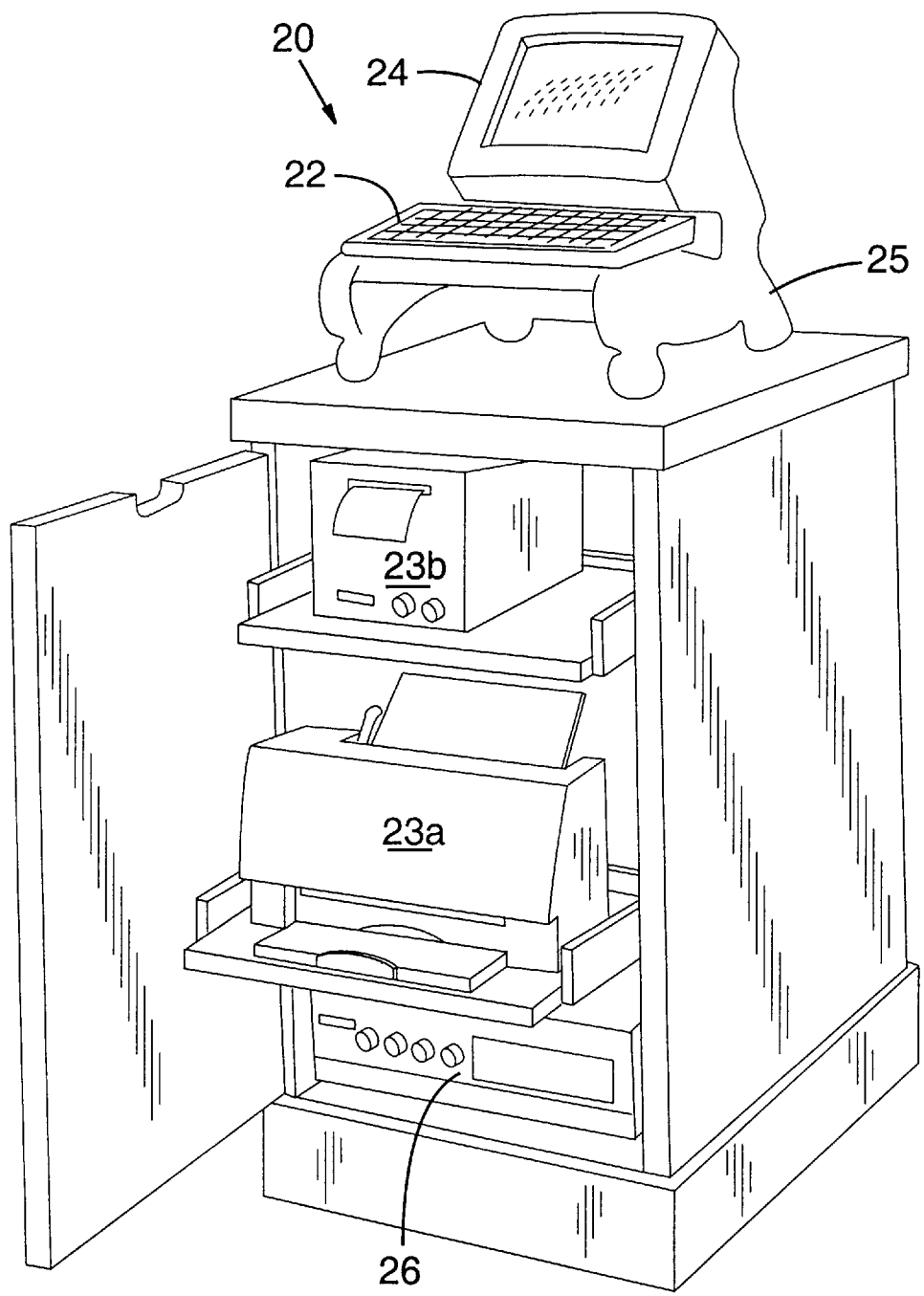
FIG. 1 is a perspective view of a preferred embodiment of an interactive data processing system and method according to the invention.

Referring to FIG. 1, there is shown an embodiment of an interactive data processing system according to the invention in the form of a programmed personal computer 20. The computer includes a data entry device 22 such as a mouse or keyboard, printers 23a,b, a display device 24 and a chassis 26 containing a CPU, memory, disk drive and other common components of a computer. Typically for this invention the computer 20 is mounted on a stand 25 at a location for customer use such as an entrance, lobby, foyer, vestibule, garden, patio, or other are accessible to customers. Of course, other forms of computer 20 may be uses, such as a video display terminal in communication with a remote computer, etc.

Figure 2:
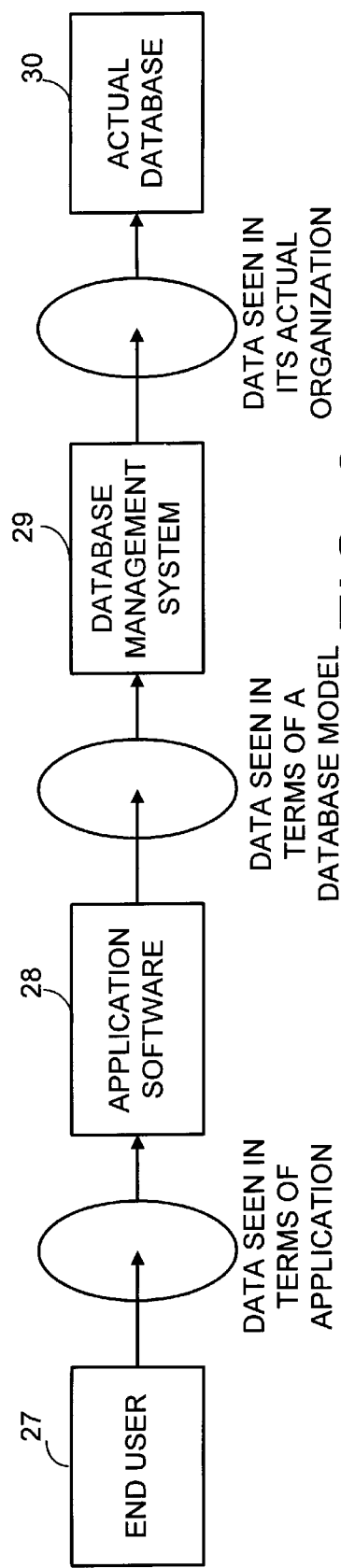
FIG. 2 is a block diagram of the conceptual layers of a database showing the relationship between application software according to the invention and the database.

In the present embodiment, the invention is implemented in a computer with a database management system (DBMS) such as the dBASE database program from Borland International, Inc. of Scotts Valley, Calif. dBASE, like many database management systems, includes a programming language for customizing the entry, manipulation and display of data through means such as the generation of various screen displays. This programming language, referred to in the art as a host language, is used to write application software that embodies the present invention. The relationship between application software and a DBMS is shown in FIG. 2. An end user (which may be a customer or operator of the business) interacts with the DBMS 29 and actual database 30 through the application software 28. The application software produces a series of screen displays that allow an end user 27 to enter, manipulate, compile or otherwise work with the data in database 30. Data or commands from an end user are communicated by the application software 28 to the database management system 29, with the data seen by the application software in terms of a database model. In the present embodiment the database model used is a relational model, with the stored data being portrayed as stored in tables called relations. FIGS. 3–16 show the design and structure of the application software 28. It is believed that these figures and accompanying description provide sufficient information for one of ordinary skill in the art of database programming to produce the features of the invention described and claimed herein.

Figure 3:
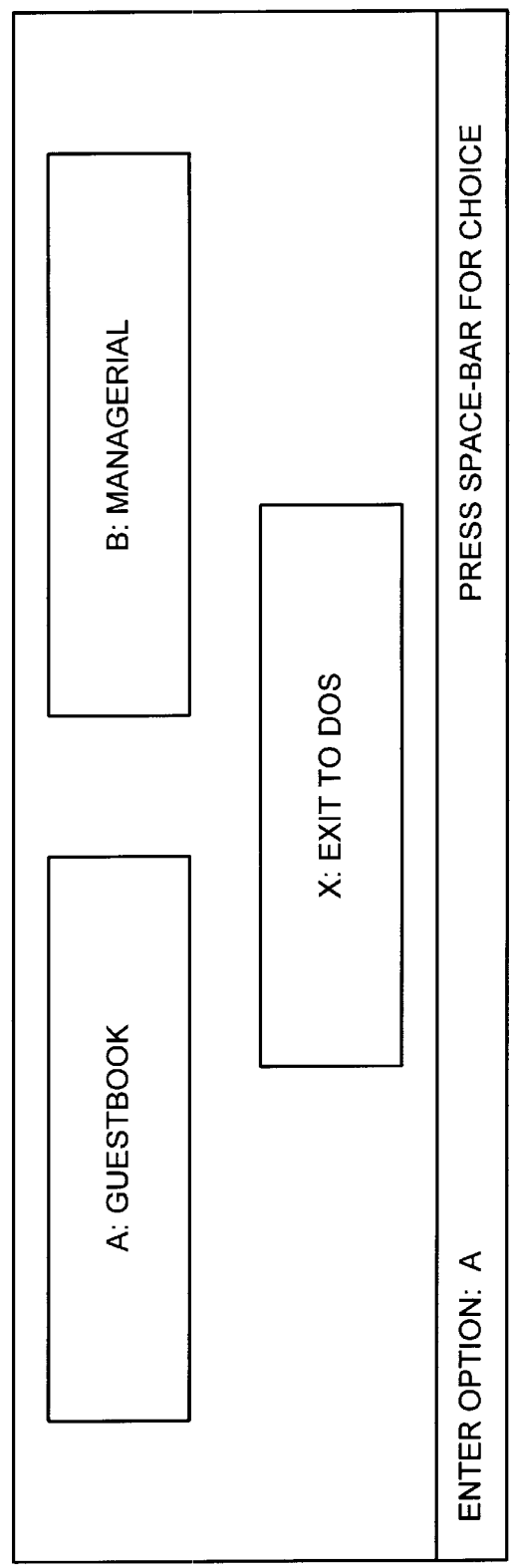
FIG. 3 is a screen display that appears on power up of the system, showing the options provided to the operator.

FIG. 3 is an example of a screen display 31 generated by application software 28 which an operator-end user of the interactive data processing system sees upon powering up the system. The display lists three options: display an initial screen display that a customer sees (referred to as the "GuestBook™" option in display 18); provide access to the set up of the data processing system (referred to as the "managerial" option in the display); and deactivate the data processing system by exiting the program portion and returning to the operating system prompt. Assuming the system is ready for operation, the first option ("GuestBook™") is chosen, resulting in the screen display of FIG. 4.

FIG. 4 shows an example of an initial customer screen display 32 according to the invention which a customer-end user sees upon encountering the computer 20. The display includes an incentive message 33 for inducing a customer to enter his or her name and address in data fields that are subsequently displayed if the customer interacts with the system by pressing any of the keys. The message 33 is displayed by the data processing system for inducing customers to enter data about themselves into a customer database. The system also selects, as part of the inducement, one or more of the entered customer names for a reward according to a selection procedure, as will be described.

Referring to FIG. 5, upon customer interaction the computer 20 displays a subsequent screen display 34. The display includes a plurality of data fields such as fields 35 associated with a customer database stored within the system upon pressing of a key on the keyboard. The fields ask for personal information such as customer name, address, phone, spouse name, birthday, wedding anniversary, etc. Also displayed is a list of selected questions associated with additional data fields 36 seeking other information such as quality of service, opinions, preferences, why the customer chose the business, etc. The questions may seek answers of several types such as yes/no, true false, multiple choice, quality, or descriptive answers. The data entered by customers into the data fields 35, 36 provide the basis for sending tailored promotional messages in the form of letters, phone calls, facsimiles, etc. to customers listed in the database, as will be described. Once the customer has completed entering data into the fields 35,36, the system prompts him for confirmation. If the customer confirms that data entry is complete and correct, the system may notify him of a reward or that he has been entered in a drawing, etc.

FIGS. 6–16 are flow charts illustrating various methods employed by the data processing system to compile customer data and generate targeted promotional messages. As noted above, the methods are preferably implemented in computer programs written in a database programming language. However, other implementations of these methods are certainly contemplated and may be used without departing from the scope of the invention.

Figure 6:
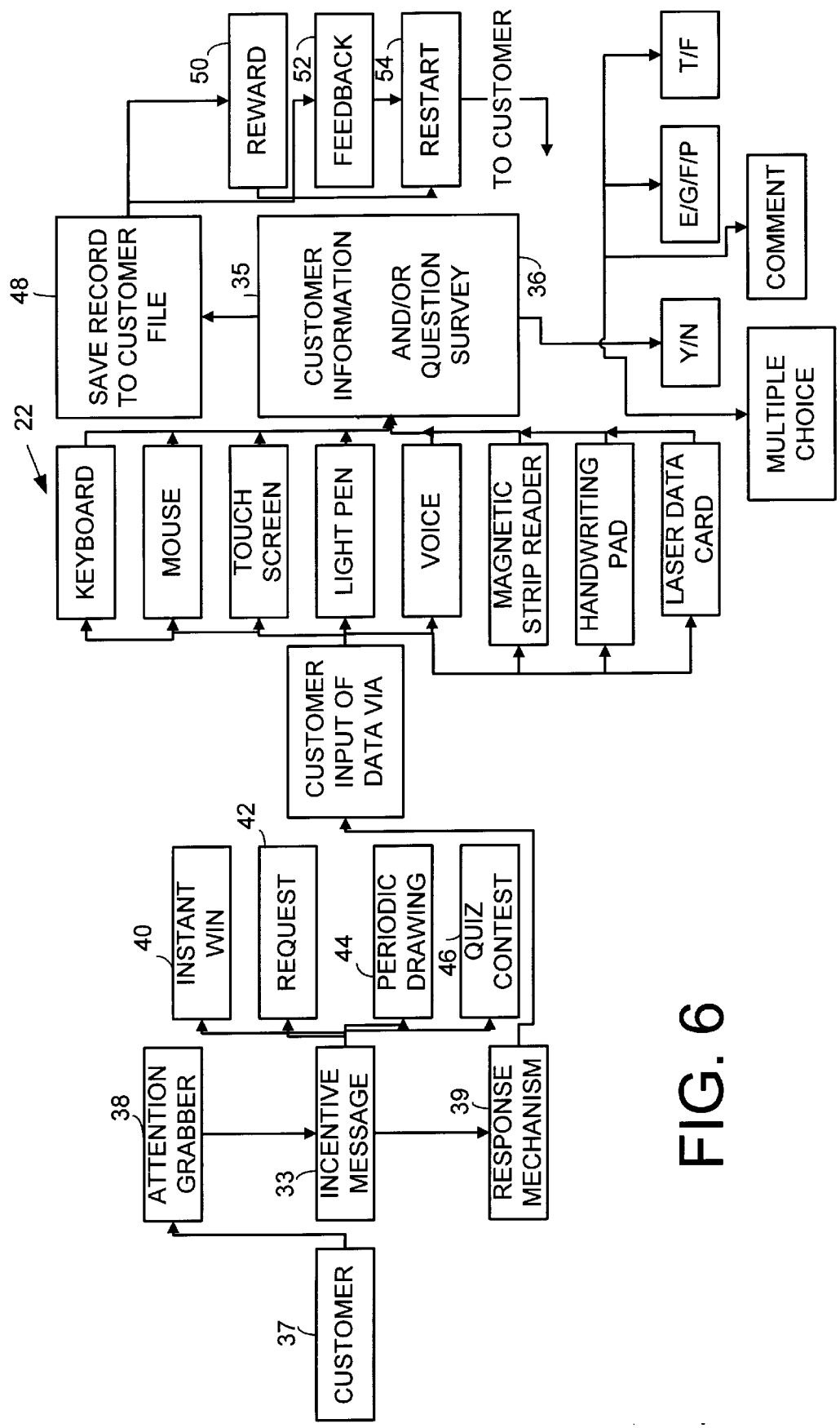
FIG. 6 is a flow chart of a customer interaction portion of the interactive system and method.

FIG. 6 is flow chart of how a customer 37 interacts with the system of the invention, beginning with customer observation of the screen display 34. The screen is generated by the application software 28 and, as shown in FIG. 4, includes an attention grabber 38 such as a flashing rectangle, incentive message 33 and a response mechanism 39 such as a "press any key" displayed statement. Message 33 is displayed as part of an inducing means that also includes a reward generated in a number of ways. In the preferred embodiment, the reward may be generated by an instant win contest 40, periodic drawing 44 or a quiz contest 46. Other types of contests are, of course, possible. Alternatively, the message 33 may take the form of a personal request 42, without the lure of a reward.

Assuming the customer is induced to respond, he or she inputs data into the system via a data entry device 22 such as a keyboard, a mouse or any other suitable means including but not limited to the devices described in FIG. 6. Customer 37 enters the data into fields 35 and 36 of screen display 34. For the questions, the customer must provide an appropriate answer (e.g., Y/N for yes/no-type questions) for the data to be accepted.

Once the customer has completed his data entry, the system saves the customer data as a record in the customer database 30 (48). The system may then check to see if a reward is due the customer (50), gives the customer feedback (52) such as a thank-you message display, and then restarts (54) to redisplay screen display 32 for another customer.

Figure 7:
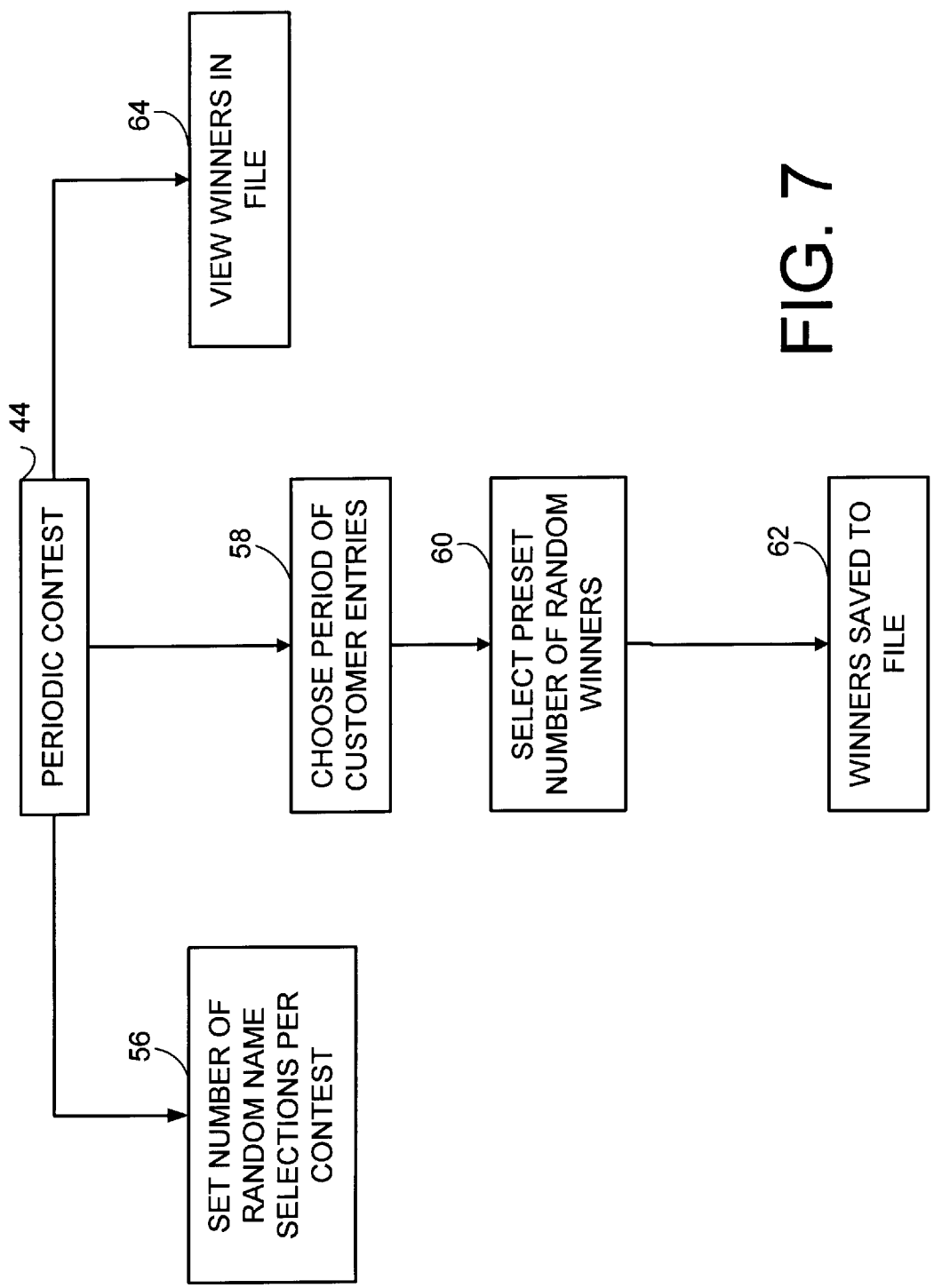
FIG. 7 is a flow chart of a periodic drawing contest portion of the interactive system and method.

The various incentives offered to customers via the message 33 are selected and manipulated by an operator-end user through the "managerial" option of screen display 31. These options are illustrated in FIGS. 7–10. FIG. 7 is a flow chart of how the periodic drawing 44 may be carried out. The system has a step 56 which allows the operator-end user to select in advance a predetermined number of random name selections per contest, such as one, two or more winners. At the time winners are to be determined, the operator chooses the time period for customer entries (58), such as for entries for the last month. The system, in response, selects randomly the predetermined number of winners for the designated time period (60). The system then saves the winning customer names to a file (62) for later association with a promotional message such as a letter informing the customer of his reward. The system also lets the operator view the winners by name (64).

Figure 8:
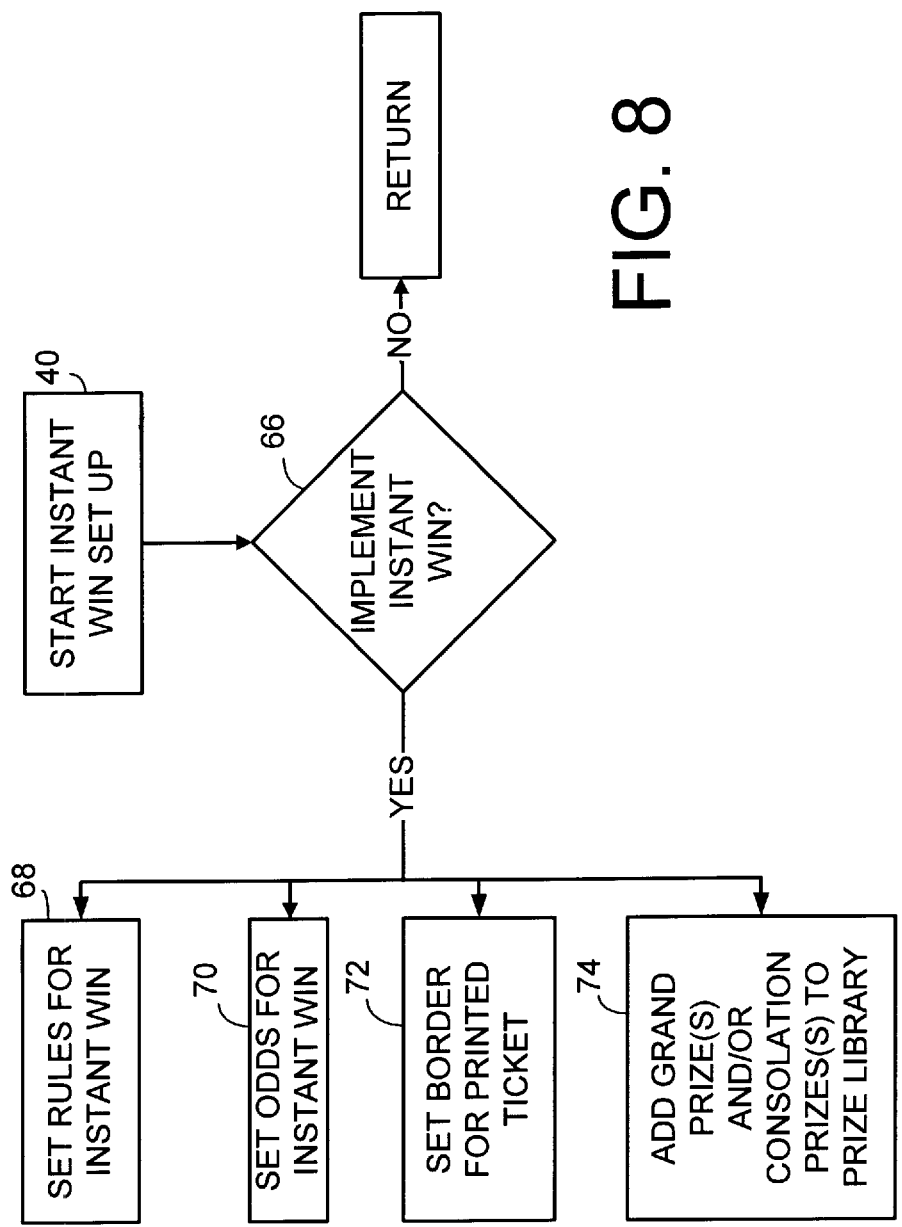
FIG. 8 is a flow chart of an instant win set up portion of the interactive system and method.

FIG. 8 is a flow chart of the set up for the instant win option (40). Instant win is an option that prints a ticket immediately after the customer enters his or her data into the system. If the operator-end user chooses to implement instant win (66), he may take up to four additional steps. One step 68 allows the operator to set rules for the instant win, such as random draw, etc. Another step 70 allows the operator to set the odds for the instant win, such as 1 out of 100. A third step 72 permits the operator to set the border pattern for the instantly printed ticket. And a fourth step 74 permits the operator to include grand prizes and consolation prizes in a prize library. The grand or consolation prize is printed on the ticket to inform the customer immediately what he or she has won. Included on the ticket may be other printed matter such as coupons, advertisements, etc.

Figure 9:
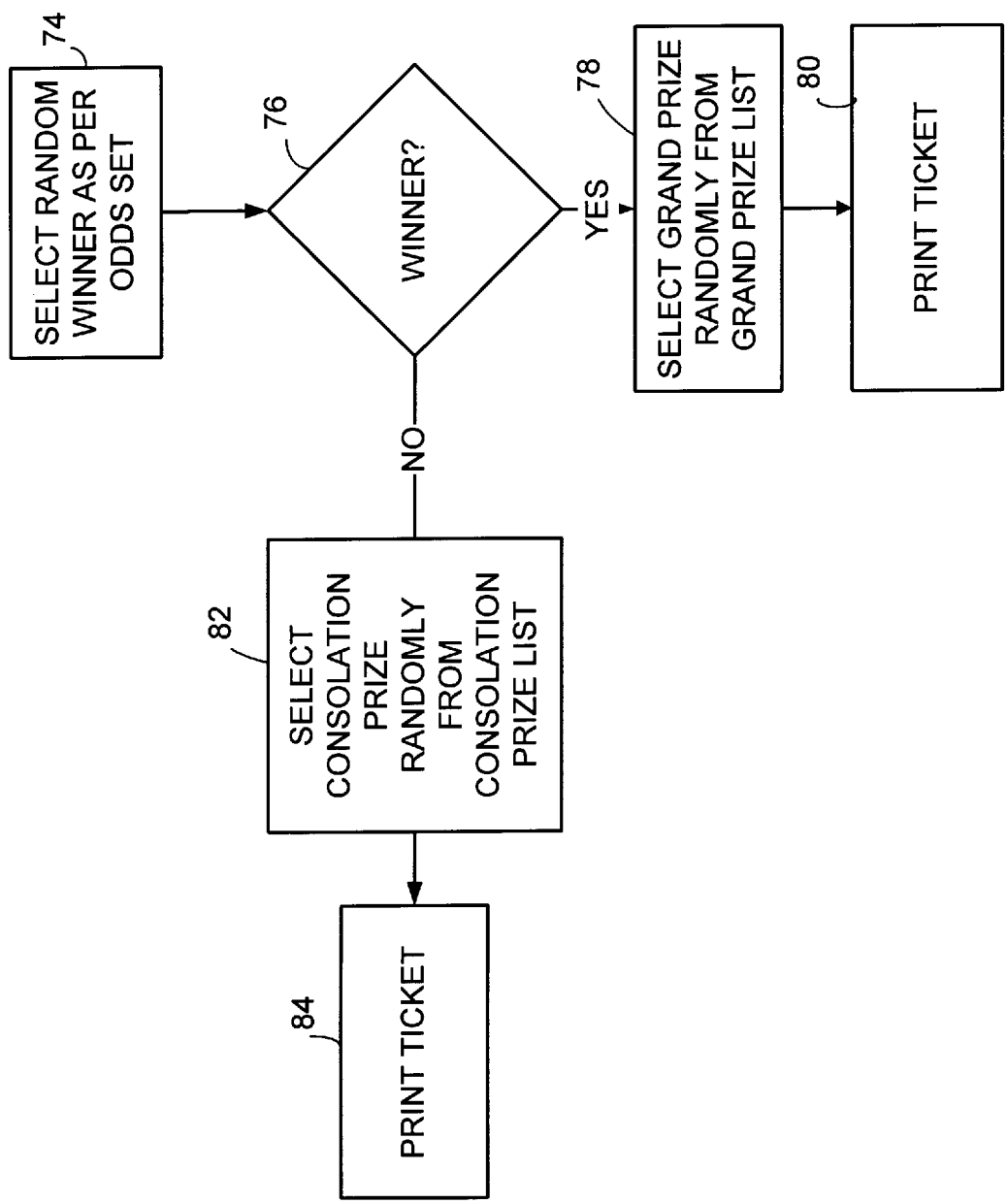
FIG. 9 is a flow chart of an instant win portion of the interactive system and method.

FIG. 9 is a flow chart of the instant win option implementation. If this contest option is active and set up is complete, the system selects a random winner per the odds chosen (74). If the customer is a winner (76) then the system randomly chooses a prize from a list of grand prizes in the prize library (78), and the customer ticket is printed with the name and the prize (80). However, if the customer is not a winner, then the system randomly picks a prize from the list of consolation prizes in the prize library (82) and then prints the ticket (84). The customer thus wins a prize in any event and is rewarded for entering the data. To prevent abuse, the system may prohibit the same name and address to be entered again for a predetermined time.

Figure 10:
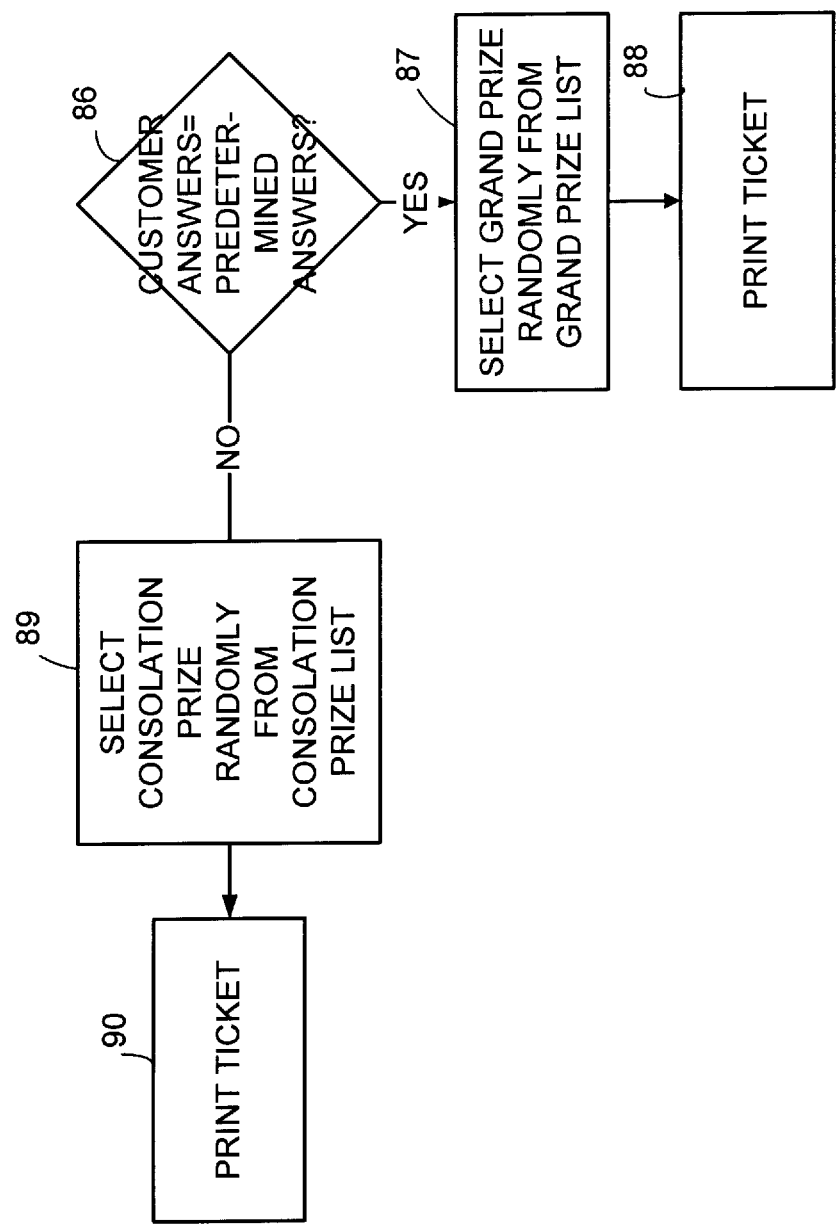
FIG. 10 is a flow chart of a quiz contest portion of the interactive system and method.

FIG. 10 is a flow chart of the quiz contest option (46). The system has a library of contest questions, one of which is asked of a customer after the customer has entered data. If the customer's answer to the contest question matches the predetermined answer (86), then the system randomly selects a prize from the list of grand prizes (87) and prints a winning ticket with the customer's name and prize (88). If the customer's answer does not match a predetermined answer, then the system selects a prize from the list of consolation prizes (89) and prints a ticket accordingly (90).

Figure 11:
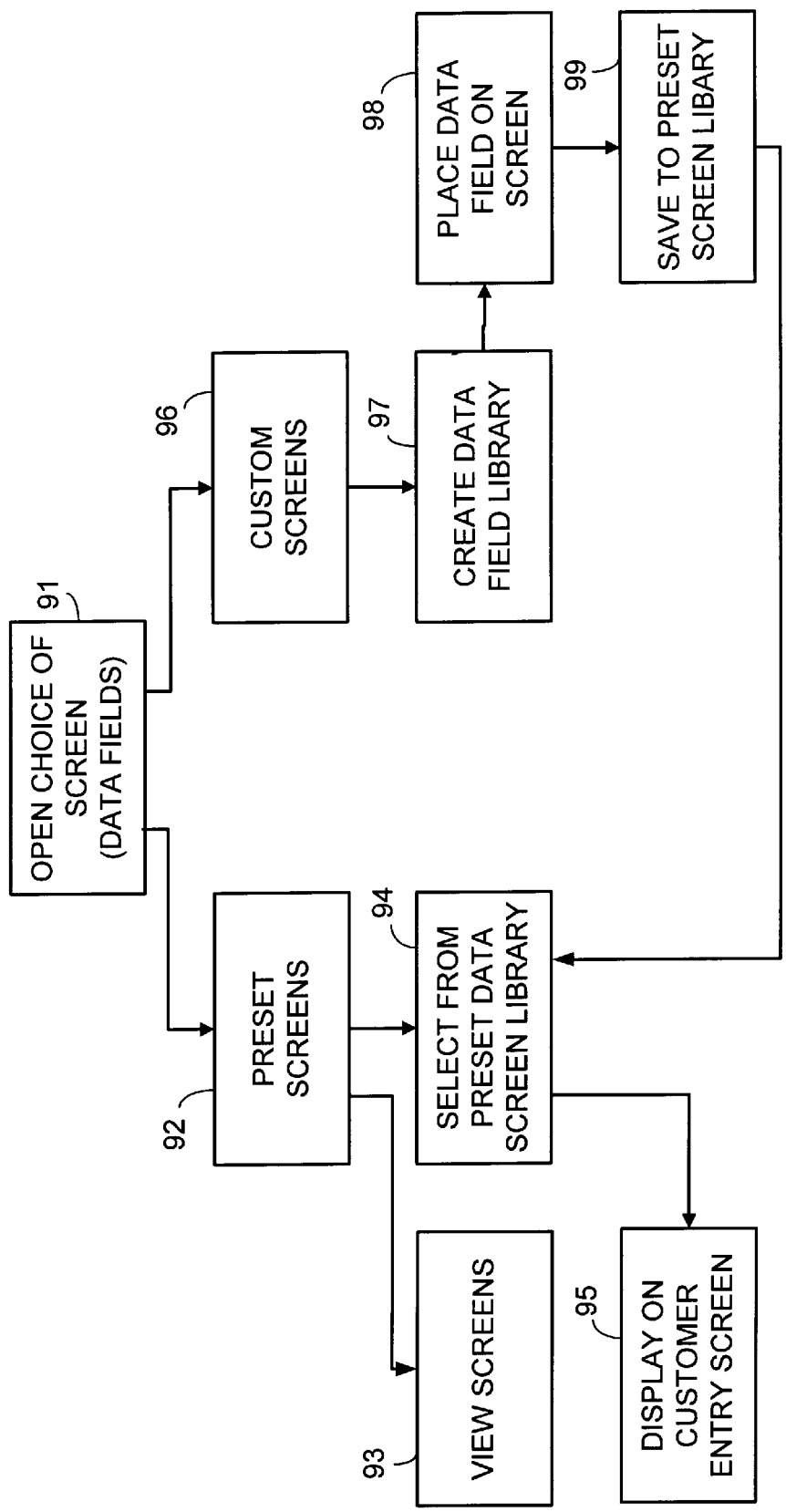
FIG. 11 is a flow chart of a choice of screens portion of the interactive system and method.

The operator may also change the appearance of the customer screen display 34 through the "managerial" option shown in the screen display of FIG. 3. FIG. 11 is a flow chart of a process for changing the data fields for a screen display (91). If an operator wishes to choose from among preset screens that are offered with the system, he chooses the preset screens option 92 and can then view the available screens (93) before selecting one from a screen library (94) for display on screen display 34 (95). However, the operator also has the option of creating his own custom screen (96) rather than selecting a preset screen from the library. He creates desired data fields 35 (97) and places them as desired in a screen display (98). The resultant set of data fields 30 is then saved as a display to the screen library (99) where it may then be selected as any other screen (94).

Figure 12:
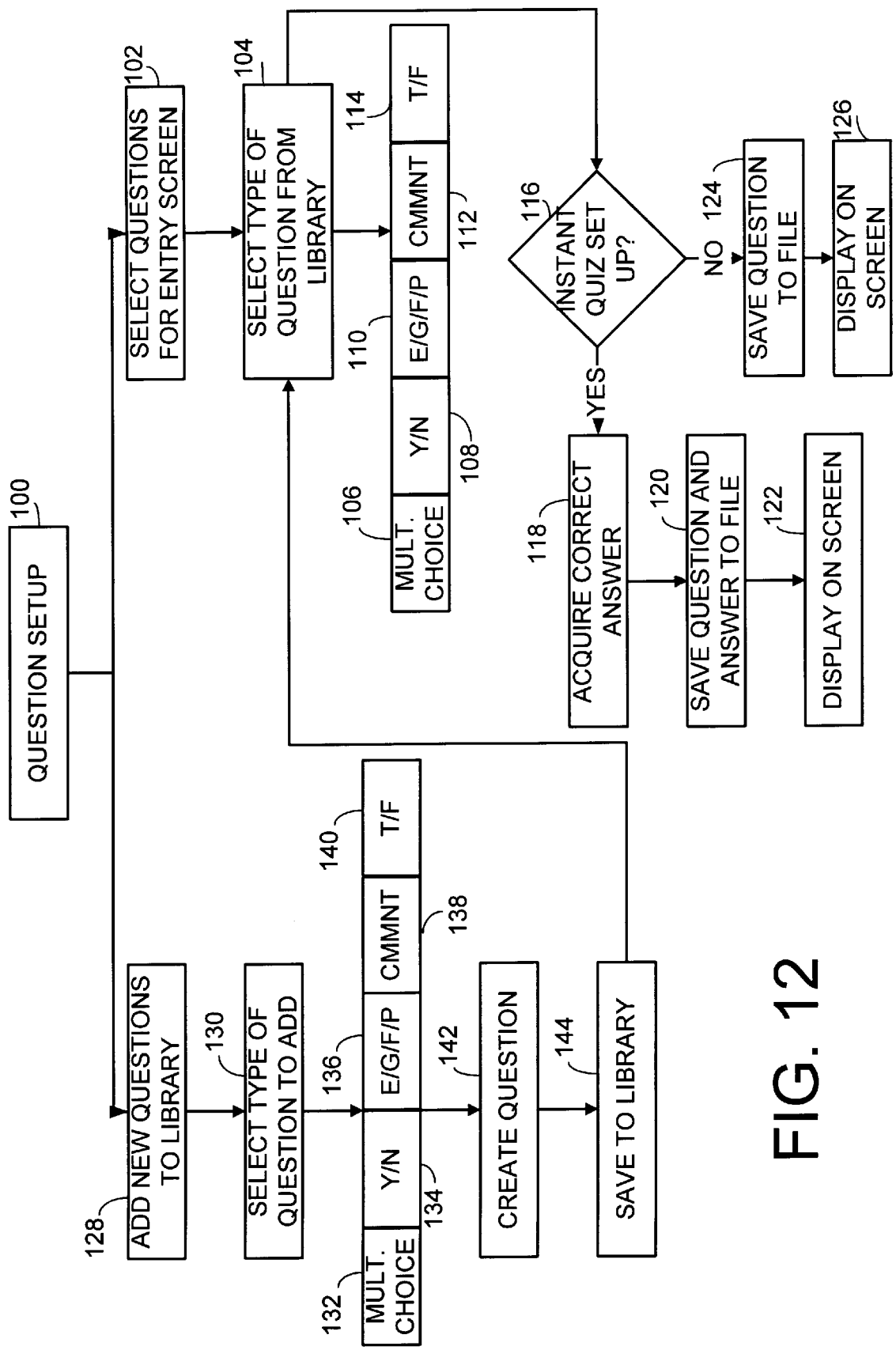
FIG. 12 is a flow chart of a question set up portion of the interactive system and method.

The questions that appear in data fields 36 may also be selected by the operator for screen display 34. In the present embodiment, questions may be chosen from a library of questions accessible through the "managerial" option. FIG. 12 is a flow chart of a preferred method for selecting/creating questions. The operator-end user initially chooses question set up from a menu of options (100). If the operator wishes to select questions from the existing library of questions, he chooses a select option 102. The system in response displays questions as they presently appear on the screen display 34 and prompts the operator to confirm the present question, or to select from among different types of questions (104) such as multiple choice (106), yes/no (108), quality (110), comment (112), or true/false (114). The operator is then further prompted if he wants the selected question to be a question for the quiz or instant win options (116). If so, the system selects a question and answer (118), saves them to a file (120) for display on the appropriate screen display (122) as a reward for entering data into the data fields of screen display 34. If the question is not to be used for the instant win option (116), then the question is simply saved as part of the data field 35 (124) for display on the device display screen (126).

The operator may also create new questions for screen display 34. In FIG. 12, this option is exercised by adding new questions to the question library (128). The operator first selects what type of question(s) to add (130), such as multiple choice (132), yes/no (134), quality (136), comment (138) or true/false (140). He is then presented with a field in which to enter a text string to create the question (142), which text is preferably echoed on screen as it would appear in screen display 34. If acceptable, the operator saves the added question to the yes/no portion of the question library (144). The added question may then be selected by following steps 102–126.

Figure 13:
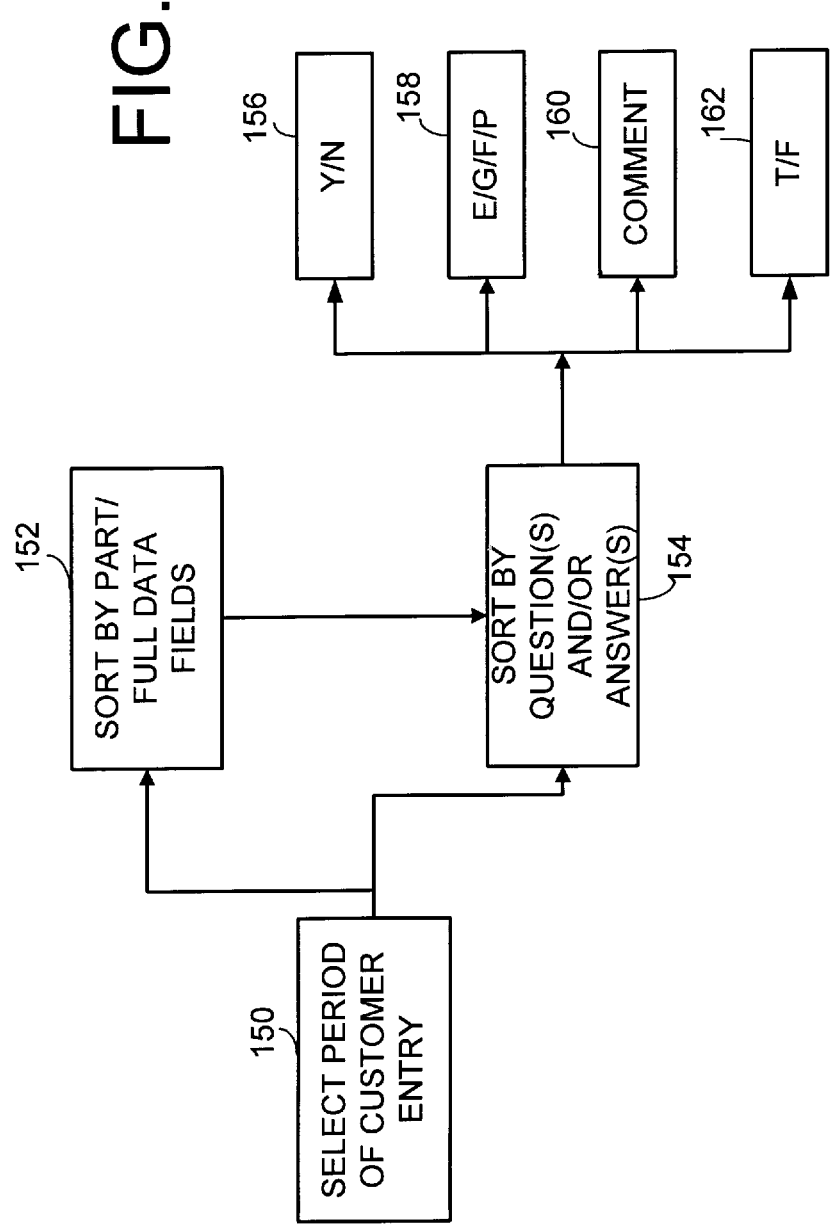
FIG. 13 is a flow chart of a customer selection portion of the interactive system and method.

One of the primary purposes of any database system is selecting records according to predetermined criteria. The present invention provides a simple yet powerful technique for selecting customers based on the date of data entry, data field or question/answer. Under the "managerial" option, the operator may select customer records according to this criteria. Referring to FIG. 13, the operator enters a time frame for customer entry (150) and selects the sorting criteria. That criteria may be data field 35 entry (152). For example, the operator may request a list of all customers for the past 12 months who have anniversaries in March for the purpose of sending them an anniversary discount coupon in March. The criteria may also be a data field 36 entry (i.e., questions and their answers) (154). For the question-based data fields, sorting may further be done by answers to types of questions such as yes/no (156), quality (158), comment (160) or true/false (162). For example, the operator may request list of all customers in the last 12 months who indicated they wanted information on private dining rooms. The entries retrieved as a result of a sort can be tagged for later retrieval as a mail list. The mail list may then be merged with a form letter or other promotional means, as described below.

Figure 14:
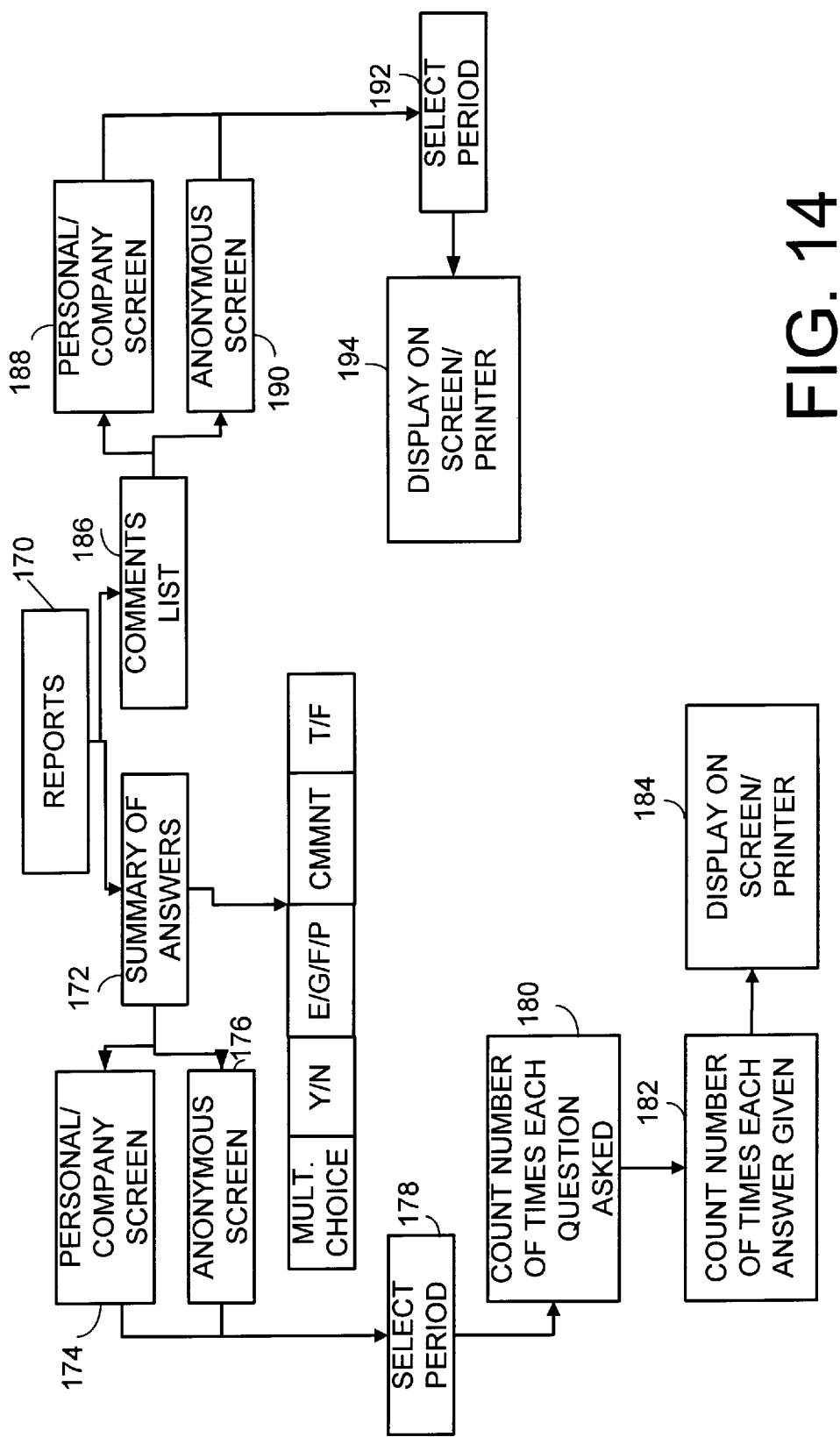
FIG. 14 is a flow chart of a reports/statistical data analysis portion of the interactive system and method.

Another purpose of database systems is to generate reports summarizing the information in the database in a useful format. FIG. 14 is a flow chart of how reports 170 are generated in the present embodiment of the invention. A first option is to generate a summary report on answers (other than comments) to questions asked (172). These questions may be those asked in conjunction with the display of customer data fields including name and address (174) or may be from an anonymous screen display where the identity of the person is not given (176). The operator makes a selection and then is prompted for a time period of interest, such as the last year (178). In response, the system provides a list of the types of questions asked (e.g., yes/no, true/false), which questions of each type were asked, and how they were answered (e.g., yes, no, no answer) (180–182). This information is displayed, printed or otherwise communicated to inform the operator what customers like and dislike and which questions were most effective in gathering data from customers (184).

For comments, the operator chooses a comment option (186). After selecting identified or anonymous screens (188–190), the operator selects a data entry period (192), each question that has a descriptive answer is displayed or printed, followed by a list of its descriptive answers (194). This information also informs the operator what customers like and dislike as well as indicating which questions are most effective in gathering data.

Figure 15:
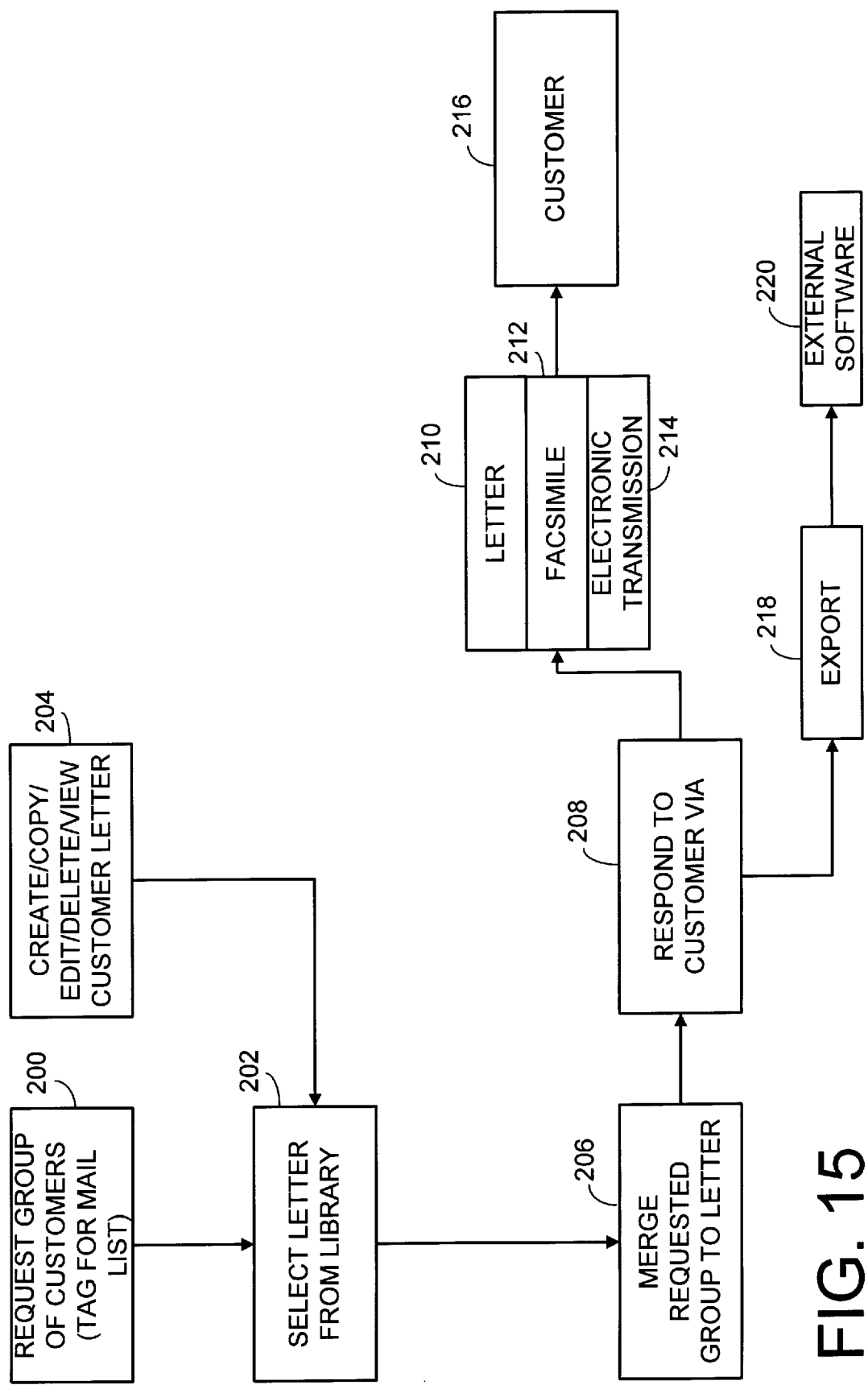
FIG. 15 is a flow chart of a targeted response portion of the interactive system and method.

The data gathered through customer entry may be used to generate promotion messages through another "managerial" option. FIG. 15 is a flow chart of a method of generating promotional customers for customers, based on the data entered into the customer database. A group of customers is requested by a "tagging" as described in conjunction with FIG. 13 (200). The operator then selects an appropriate promotional message such as a letter for the tagged group from a library of letters (202). The library is comprised of letters or other messages created by the operator. To that end, the system provides a variety of screen displays (204) for enabling the operator to create new customer letters for the library from scratch or through copying or editing, to delete letters from the library, or to view the letters in the library before selection. With a letter selected by the operator, the system merges the letters with the tagged group of customers, using information from the appropriate data fields such as name, address and personal dates in fields within the letter (206). The operator then sends the promotional message (208) in an appropriate format such as letter (210), facsimile (212), electronic mail (214) or other medium to the customer (216). Alternatively, the operator may export the messages (218) outside the data processing system to external software (220) for a separate mailing or other transmission to customers.

Figure 16:
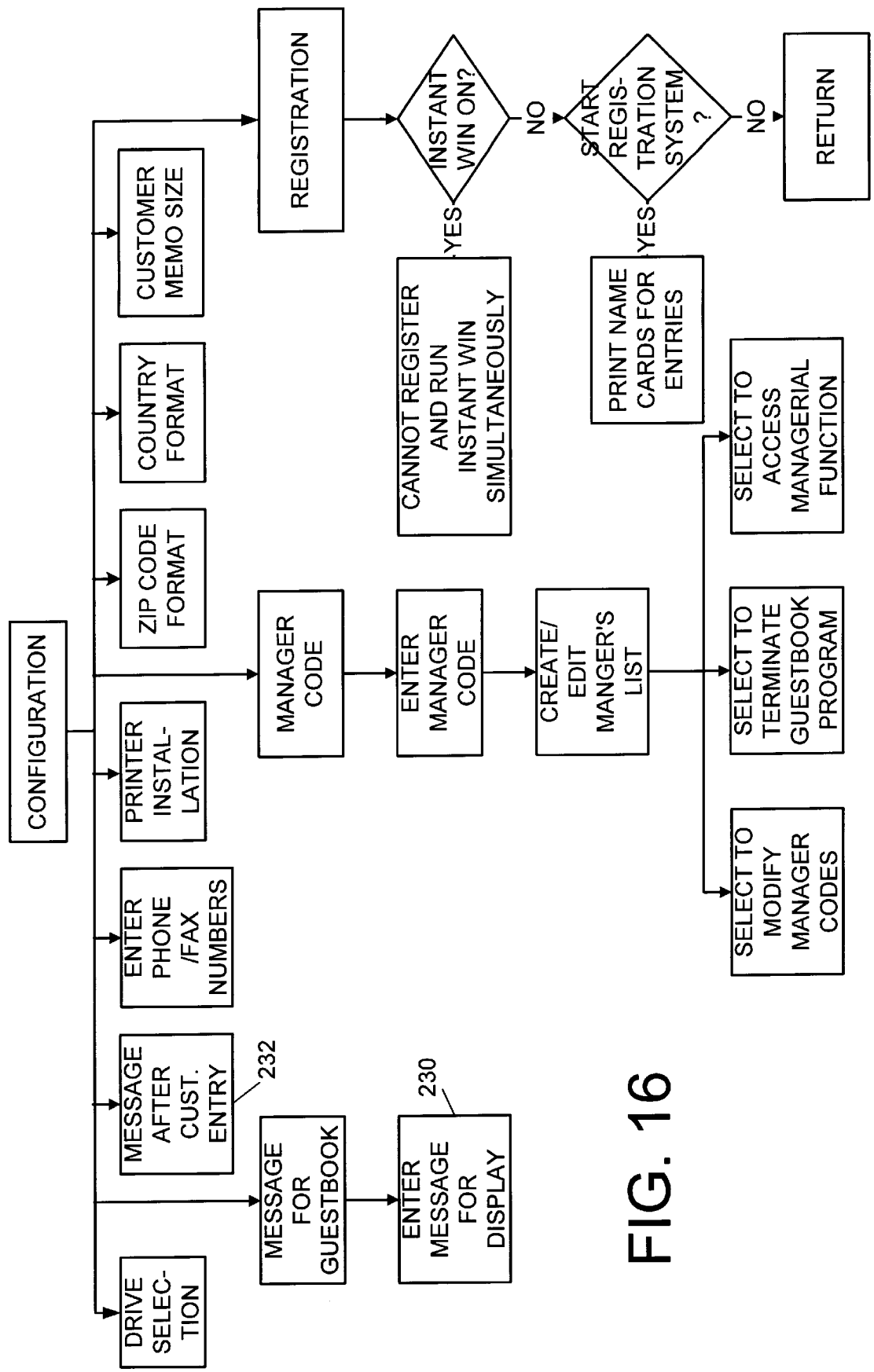
FIG. 16 is a flow chart of a configuration portion of the interactive system and method.

The operator may configure other aspects of the data processing system through another "managerial" option. FIG. 16 is a block diagram of a configuration option that allows for, among other things, editing the incentive message 33 (230) and editing the message that confirms customer entry of data (232).

Having illustrated and described the principles of the invention in a preferred embodiment, it should be apparent to those skilled in the art that the embodiment can be modified in arrangement and detail without departing from such principles. For example, the appearance of the various screen displays and the arrangement of options offered by the system may be changed as desired. Other DBMS software and even non-DBMS software with equivalent capability may, of course, be used in place of dBASE software.

Therefore, the illustrated embodiment should be considered only as preferred example of the invention and not as a limitation on its scope, which is defined by the following claims. We therefore claim as our invention all modifications and equivalents to the embodiment coming within the scope and spirit of these claims.

We claim:

1. An interactive data processing system for surveying and targeting customers of a particular business, comprising:

a customer database;

means for providing a plurality of customer data fields, including fields for name, address and other personal data, associated with the customer database;

a data entry device locatable in a customer access area of the business for customers to enter customer data into the data fields, including customer name, address and other personal data, and thereby into the customer database;

means for a business operator to select customers from the database by selecting one or more customer data fields and entering desired customer data therein;

a library of promotional messages with fields for incorporating a customer's name, address and other personal data;

means for the business operator to select a promotional message from the message library; and means for the business operator to associate a selected customer with the selected promotional message to generate a personalized promotional message incorporating the customer-entered name, address, and other personal data.

2. The system of claim 1 including means for inducing customers to enter data about themselves into the customer database.

3. The system of claim 1 wherein the means for providing a plurality of data fields includes means for displaying the data fields on a display device.

4. The system of claim 3 wherein the means for providing a plurality of data fields is constructed to provide data fields for customer name, address, or dates.

5. The system of claim 1 wherein the means for providing a plurality of data fields is constructed to provide questions associated with data fields.

6. The system of claim 5 including means for generating a summary report on the questions asked.

7. The system of claim 6 including means for generating a summary of answers by customers to questions asked.

8. The system of claim 1 wherein the means for generating promotional messages to customers is constructed to generate letters to customers based on the data entered by customers.

9. The system of claim 1 wherein the other personal data includes data given in response to express questions associated with data fields, the system including:

a library of questions for gathering data about customers; and means for the business operator to select questions from the library for association with the data fields.

10. The system of claim 9 including means for the business operator to create questions for the library.

11. The system of claim 1 including:

means for tagging one or more customers selected from the database; and means for associating the tagged customers with the selected promotional message to generate a personalized message for each tagged customer.

12. The system of claim 1 including means for the business operator to create promotional messages for the message library.

13. A computerized, interactive marketing system for individually targeting customers, comprising:

means for providing to customers a plurality of customer data fields, including name and address and other personal data fields associated with a customer database;

a data entry device for customers to enter data into the fields, including customer name and address, and thereby into the customer database;

means for a business operator to select customers from the database by the data entered into one or more data fields;

a library of promotional messages with fields for incorporating the customer-entered data;

means for the business operator to select a promotional message from the message library; and means for the business operator to associate one or more of the selected customers with the selected promotional message.

14. The system of claim 13 wherein the means for providing a plurality of customer data fields is constructed to display the data fields for customers data entry.

15. A computerized, interactive marketing system for individually targeting customers whose data is stored in a database, comprising:

a database containing information about customers, the information organized by data fields, including name and address and other personal data fields;

means for a business operator to select customers from the database by selecting a database field and entering customer data therein;

a library of promotional messages with fields for incorporating the customer information;

means for the business operator to select a promotional message from the message library; and means for the business operator to associate one or more of the selected customers with the selected promotional message.

16. The system of claim 15 wherein the data fields include fields associated with questions asked of a customer.

17. A computerized, interactive marketing system for individually targeting customers, comprising:

means for providing to customers a screen display having customer data fields including fields for name, address and other personal data;

a library of promotional messages with fields for incorporating a customer's name, address and other personal data;

a library of questions for gathering data about customers;

means for a business operator to select questions from the library for inclusion in the screen display; and means for displaying the screen display with the data fields and selected questions for customer entry of textual data.

18. The system of claim 17 including:

means for providing to the business operator a collection of screen displays, each display having a number of associated data fields; and means for the business operator to select a screen display from the collection, the selected questions being included in the selected screen display.

19. The system of claim 17 including means for the business operator to create questions for the question library.

20. The system of claim 1 wherein the data entry device comprises a keyboard in communication with a computer.

* * * * *